(12) United States Patent
Feng et al.

(10) Patent No.: US 9,967,222 B2
(45) Date of Patent: May 8, 2018

(54) METHOD AND DEVICE FOR MANAGING SHARED MEMORY IN ROBOT OPERATING SYSTEM

(71) Applicant: BEIJING BAIDU NETCOM SCIENCE AND TECHNOLOGY CO., LTD., Beijing (CN)

(72) Inventors: Jingchao Feng, Beijing (CN); Liming Xia, Beijing (CN); Quan Wang, Beijing (CN); Ning Qu, Beijing (CN); Zhuo Chen, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 108 days.

(21) Appl. No.: 15/279,138

(22) Filed: Sep. 28, 2016

(65) Prior Publication Data

US 2017/0353418 A1 Dec. 7, 2017

(30) Foreign Application Priority Data

Jun. 2, 2016 (CN) .......................... 2016 1 0390625

(51) Int. Cl.
*G06F 15/16* (2006.01)
*H04L 12/58* (2006.01)
(Continued)

(52) U.S. Cl.
CPC .............. *H04L 51/18* (2013.01); *B25J 9/161* (2013.01); *G05B 19/418* (2013.01);
(Continued)

(58) Field of Classification Search
USPC ............ 709/204; 370/392; 711/153; 718/107
See application file for complete search history.

(56) References Cited

U.S. PATENT DOCUMENTS

| 5,742,825 A * | 4/1998 | Mathur ................. G06F 9/4887 718/107 |
| 6,314,501 B1 * | 11/2001 | Gulick ..................... G06F 9/54 711/153 |

(Continued)

FOREIGN PATENT DOCUMENTS

| CN | 1378143 A | 11/2002 |
| CN | 1787588 A | 6/2006 |

*Primary Examiner* — Tammy Nguyen
(74) *Attorney, Agent, or Firm* — Seed IP Law Group LLP (57) ABSTRACT

Disclosed in the present application are a method and device for managing a shared memory in a robot operating system. A detailed embodiment of the method comprises: acquiring a shared memory registering service request transmitted from a message receiving node, the shared memory registering service request comprising a topic name and a size of a required memory segment; requesting a memory segment in a shared memory area based on the size of the required memory segment, associating the topic name with the requested memory segment, and saving the topic name in a configuration file; dividing the requested memory segment into a plurality of memory blocks based on a size of a message transmitted from a message transmitting node; and deallocating the requested memory segment where any one of following conditions is satisfied: the topic name in a main node is inconsistent with that in the configuration file, the message transmitting node and message receiving node stop working, and the message receiving node stops subscribing to a topic corresponding to the topic name. By means of the embodiment, the shared memory of the robot operating system is allocated and managed more reasonably and flexibly.

11 Claims, 4 Drawing Sheets

(51) Int. Cl.
*B25J 9/16* (2006.01)
*G06F 3/06* (2006.01)
*G06F 12/02* (2006.01)
*H04L 29/08* (2006.01)
*G05B 19/418* (2006.01)

(52) U.S. Cl.
CPC ............ *G06F 3/0604* (2013.01); *G06F 3/067* (2013.01); *G06F 3/0631* (2013.01); *G06F 3/0637* (2013.01); *G06F 12/023* (2013.01); *H04L 67/10* (2013.01); *H04L 67/125* (2013.01); *G06F 2212/1016* (2013.01); *G06F 2212/1044* (2013.01); *G06F 2212/154* (2013.01); *G06F 2212/173* (2013.01)

(56) References Cited

U.S. PATENT DOCUMENTS

| | | | |
|---|---|---|---|
| 9,641,432 B2* | 5/2017 | Jha | H04L 45/74 |
| 2009/0106741 A1* | 4/2009 | Dageville | G06F 11/3636 |
| | | | 717/128 |
| 2014/0254598 A1* | 9/2014 | Jha | H04L 45/74 |
| | | | 370/392 |
| 2017/0331735 A1* | 11/2017 | Jha | H04L 69/32 |
| 2017/0353418 A1* | 12/2017 | Feng | B25J 9/161 |

* cited by examiner

METHOD AND DEVICE FOR MANAGING SHARED MEMORY IN ROBOT OPERATING SYSTEM

CROSS-REFERENCE TO RELATED APPLICATION

This application is related to and claims priority from Chinese Application No. 201610390625.2, filed on Jun. 2, 2016, entitled "METHOD AND DEVICE FOR MANAGING SHARED MEMORY IN ROBOT OPERATING SYSTEM," the entire disclosure of which is hereby incorporated by reference.

TECHNICAL FIELD

The application relates to the field of computer technology, specifically relates to the field of computer operating system technology, and more specifically to a method and device for managing a shared memory in a robot operating system.

BACKGROUND

The ROS (robot operating system) uses shared memory communication which differs from the conventional communication in that: rapid transmission of messages is achieved by continuously requesting new shared memory areas, thereby achieving a low-latency control channel and a high-throughput data channel, and improving the operating efficiency of the system.

At present, the ROS utilizes an automatic memory deallocating method. The system will automatically determine whether or not to deallocate the memory, after the node process stops working. When all associations of an object are cut off and the object have not been changed to be in an accessible state after the system performs a resource cleanup, the object will lose the reference permanently and become an inaccessible state. Then, the system will actually deallocate the memory resource occupied by the object.

However, there are many problems in the automatic memory deallocating method. If the inaccessible memory is not cleaned timely due to some unusual reasons, this will result in a significant resource waste, influence the execution efficiency of other modules, and even cause the entire system to breakdown.

SUMMARY

One of the purposes of the present application is to provide an improved method and device for managing a shared memory in a robot operating system, to solve the technical problem mentioned in "BACKGROUND".

In the first aspect, the present application provides a method for managing a shared memory in a robot operating system, comprising: acquiring a shared memory registering service request transmitted from a message receiving node, the shared memory registering service request comprising a topic name and a size of a required memory segment; requesting a memory segment in a shared memory area based on the size of the required memory segment, associating the topic name with the requested memory segment, and saving the topic name in a configuration file; dividing the requested memory segment into a plurality of memory blocks based on a size of a message transmitted from a message transmitting node, a size of each of the memory blocks being greater than that of the transmitted message; and deallocating the requested memory segment where any one of following conditions is satisfied: the topic name in a main node is inconsistent with that in the configuration file, the message transmitting node and message receiving node stop working, and the message receiving node stops subscribing to a topic corresponding to the topic name, wherein the topic names of the message transmitting node and the message receiving node are maintained by the main node, the message transmitting node notifies the main node of a node name of the message transmitting node and the topic name to be published by the message transmitting node before publishing a message, and the message receiving node notifies the main node of the node name of the message receiving node and the topic name subscribed by the message receiving node before receiving a message.

In some embodiments, the requesting a memory segment in a shared memory area based on the size of required memory segment comprises: mapping a starting address of the memory segment returned after the memory segment is requested successfully, into addresses of respective processes of the message transmitting node and the message receiving node.

In some embodiments, each of the memory blocks comprises a memory block indicator for indicating a read-write state of the memory block.

In some embodiments, the method further comprises: detecting whether the time of a writing operation by the message transmitting node on a memory block and the time of a reading operation by the message receiving node on the memory block exceed a preset threshold; and if yes, setting the memory block indicator of the memory block to be writeable so as to permit a message transmitting node to newly write to the memory block.

In some embodiments, the memory segment comprises a memory segment indicator for recording sequence numbers of the memory blocks into which a message has been written.

In the second aspect, the present application provides a device for managing a shared memory in a robot operating system, comprising: a registering unit, configured to acquire a shared memory registering service request transmitted from a message receiving node, the shared memory registering service request comprising a topic name and a size of a required memory segment; a requesting unit, configured to request a memory segment in a shared memory area based on the size of the required memory segment, associate the topic name with the requested memory segment, and save the topic name in a configuration file; an allocating unit, configured to divide the requested memory segment into a plurality of memory blocks based on a size of a message transmitted from a message transmitting node, a size of each of the memory blocks being greater than that of the transmitted message; and a deallocating unit, configured to deallocate the requested memory segment where any one of following conditions is satisfied: the topic name in a main node is inconsistent with that in the configuration file, the message transmitting node and message receiving node stop working, and the message receiving node stops subscribing to a topic corresponding to the topic name, wherein the topic names of the message transmitting node and the message receiving node are maintained by the main node, the message transmitting node notifies the main node of a node name of the message transmitting node and the topic name to be published by the message transmitting node before publishing a message, and the message receiving node notifies the main node of the node name of the message receiving node and the topic name subscribed by the message receiving node before receiving a message.

In some embodiments, the device further comprises: a mapping unit, configured to map a starting address of the memory segment returned after the memory segment is requested successfully, into addresses of respective processes of the message transmitting node and the message receiving node.

In some embodiments, each of the memory blocks comprises a memory block indicator for indicating a read-write state of the memory block.

In some embodiments, the device further comprises: a detecting unit, configured to detect whether the time of a writing operation by the message transmitting node on a memory block and the time of a reading operation by the message receiving node on the memory block exceed a preset threshold; and if yes, setting the memory block indicator of the memory block to be writeable so as to permit a message transmitting node to newly write to the memory block.

In some embodiments, the memory segment comprises a memory segment indicator for recording sequence numbers of the memory blocks into which a message has been written.

The method and device for managing a shared memory in the robot operating system provided in the present application, request the memory segment according to the topic name and the size of required memory segment in the shared memory registering service request, and divide the memory segment into a plurality of memory blocks according to the size of the transmitted message. When it is monitored that the topic name in a main node is inconsistent with that in the configuration file, the message transmitting node and message receiving node stop working, or the message receiving node stops subscribing to a topic corresponding to the topic name, the allocated memory segment will be deallocated, so that the memory can be allocated reasonably and flexibly and the inaccessible memory can be cleaned timely, which improves the efficiency of using the memory.

BRIEF DESCRIPTION OF THE DRAWINGS

After reading detailed descriptions of non-limiting embodiments with reference to the following accompanying drawings, other features, objectives and advantages of the present application will be more apparent.

DETAILED DESCRIPTION OF EMBODIMENTS

The present application is further described in detail through the accompanying drawing and the embodiment. It should be understood that, the specific embodiments described herein are merely used to explain the relevant invention, and are not intended to limit the present invention. In addition, it should be further noted that, in order to facilitate the description, merely the parts related to the relevant invention are shown in the accompanying drawings.

It should be noted that, the embodiments of the present application and features in the embodiments may be combined on a non-conflict basis. The present application will be described in detail through the accompanying drawings and the embodiments.

Figure 1:
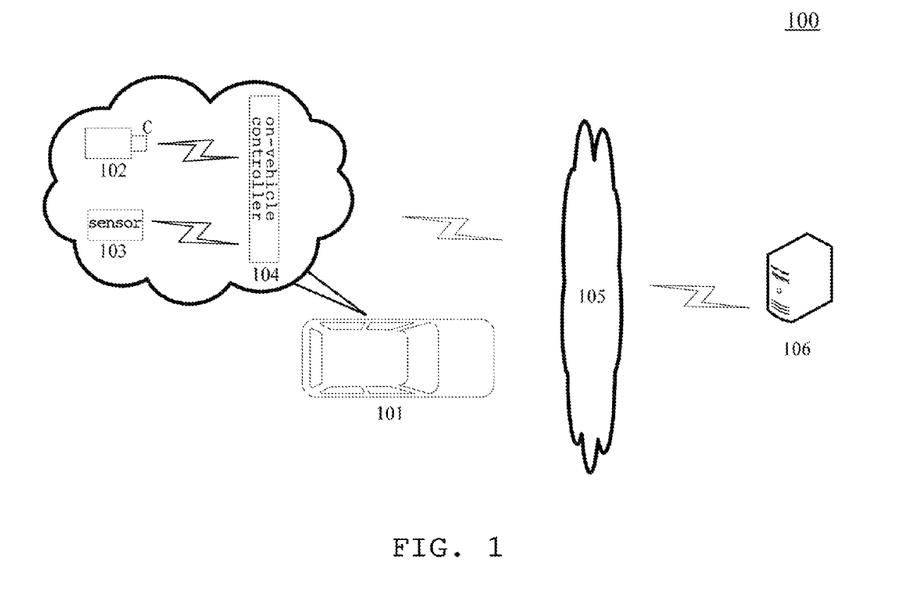
FIG. 1 is a diagram of an exemplary system architecture which the present application can be applied therein.

FIG. 1 illustrates an exemplary system architecture 100 to which a method or device for managing a shared memory in a robot operating system according to embodiments of the present application is applicable.

As shown in FIG. 1, the system architecture 100 may comprise a driverless vehicle 101, a backend server 106 and a network 105. The network 105 is used for providing a medium of the communication link between the driverless vehicle 101 and the backend server 106. The network 105 can comprise various connection types, for example, a wired or wireless communication link or an optical fiber cable.

The backend server 106 may be an server which provides various services, for example, an backend map server which provides an online map to the driverless vehicle 101.

The driverless vehicle 101 may be equipped with collecting devices 102 and 103 and an on-vehicle controller 104. The collecting devices 102 and 103 may transmit the collected information to the on-vehicle controller 104 via various communication manners (for example, a wired or wireless communication link or an optical fiber cable). The collecting devices 102 and 103 may be various electronic devices for collecting the surrounding environment information, including but not limited to cameras and radars. The on-vehicle controller 104 adopts an improved robot operating system, and converts the surrounding environment information collected by the collecting devices 102, 103 and the map information provided by the backend server 106 into control information with the cooperation of nodes in the vehicle, so that the vehicle can run on the road smoothly and exactly.

It should be noted that the method for managing a shared memory in a robot operating system provided in the embodiment of the present application is generally executed by the on-vehicle controller 104. Accordingly, the device for managing a shared memory in the robot operating system is generally arranged in the on-vehicle controller 104.

It should be understood that the numbers of the collecting devices, the driverless vehicle and the backend server in FIG. 1 are merely schematic. There may be any number of the collecting devices, the driverless vehicle and the backend server as required in practice.

Figure 2:
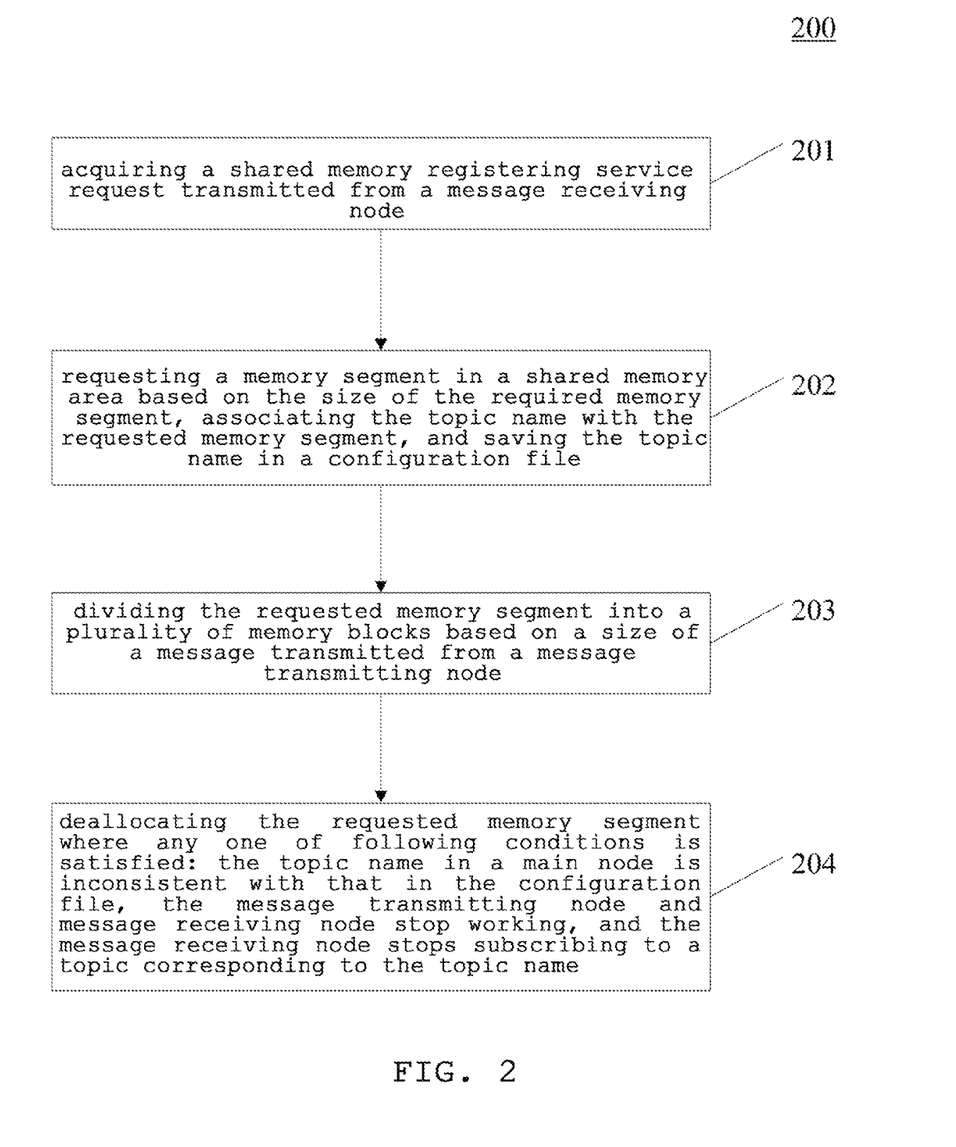
FIG. 2 is a flowchart of a method for managing a shared memory in a robot operating system according to an embodiment of the present application.

Referring to FIG. 2, it illustrates a flow 200 of a method for managing a shared memory in the robot operating system according to an embodiment of the present application. The method for managing a shared memory in the robot operating system comprises the following steps.

Step 201, acquiring a shared memory registering service request transmitted from a message receiving node.

The robot operating system includes many nodes and topics. Each node is an independent process and can communicate with other nodes. The topic is the basis for establishing the connection between nodes, and a node may publish a message on a topic and subscribe for a topic to receive a message. The message is a data type of the ROS used when publishing or subscribing for a topic. There are two kinds of nodes: transmitting nodes and receiving nodes. The transmitting nodes are responsible for transmitting the processed information, and the receiving nodes are responsible for receiving the information transmitted from the transmitting nodes and operating correspondingly according to a command (sometimes a node is both a transmitter and a receiver). When the connection between the nodes is established, the transmitting and receiving nodes perform the message transmission by sharing a memory. Performing the message transmission by sharing a memory means that a plurality of publishing and receiving nodes use the same shared memory area simultaneously.

In this embodiment, the electronic device on which the method for managing a shared memory in the robot operating system is operated (for example, the on-vehicle controller shown in FIG. 1) acquires the shared memory registering service request transmitted from the message receiving node via a memory managing process of the operating system. The shared memory registering service request comprises: a topic name and the size of a required memory segment. For example, the shared memory registering service request in which the topic name is topic1 and the size of the required memory segment is 500 M is transmitted to the memory managing process.

Step 202: requesting a memory segment in a shared memory area based on the size of the required memory segment, associating the topic name with the requested memory segment, and saving the topic name in a configuration file.

In this embodiment, the memory segment is requested in the shared memory area based on the size of required memory segment. For example, the message receiving node requests a memory segment of 500 M in the shared memory area, and the memory managing process associates the topic name topic1 with the requested memory segment of 500 M and saves the topic name topic1 in the configuration file.

In some alternative implementations of the embodiment, a starting address of the memory segment returned after the memory segment is requested successfully is mapped into addresses of respective processes of the message transmitting node and the message receiving node.

Step 203: dividing the requested memory segment into a plurality of memory blocks based on a size of a message transmitted from a message transmitting node.

In this embodiment, the requested memory segment is divided into a plurality of memory blocks based on the size of a message transmitted from a message transmitting node. The size of each memory block is greater than that of the transmitted message. For example, if the message transmitting node transmits a message of 40 M, the memory segment of 500 M may be divided into 10 memory blocks, each of which may be 50 M. Alternatively, the memory segment may be divided unevenly, but it should be ensured that the size of each memory block is greater than 40 M. Each memory block not only stores massages, but also has a part of redundant space, and the size of each memory block is generally set 1.2 times of the message.

In some alternative implementations of the embodiment, each of the memory blocks comprises a memory block indicator for indicating a read-write state of the memory block. The memory block indicator is stored in the memory block. Thus, some redundant space is needed to store the memory block indicator, by dividing the memory block.

In some alternative implementations of the embodiment, the requested memory segment comprises a memory segment indicator for recording sequence numbers of the memory blocks into which a message has been written. The message transmitting node records the sequence number of a memory block in the memory segment indicator after writing a message into the memory block, and the message receiving node can read the corresponding data according to the sequence number of the memory block, which may save the time for searching in the entire memory block.

Step 204, deallocating the requested memory segment where any one of following conditions is satisfied: the topic name in a main node is inconsistent with that in the configuration file, the message transmitting node and message receiving node stop working, and the message receiving node stops subscribing to a topic corresponding to the topic name.

In this embodiment, the application in the ROS for autonomous vehicles is formed in the form of nodes and topics, wherein the topic names of the message transmitting node and the message receiving node are maintained by the main node, the message transmitting node notifies the main node of a node name of the message transmitting node and the topic name to be published by the message transmitting node before publishing a message, and the message receiving node notifies the main node of the node name of the message receiving node and the topic name subscribed by the message receiving node before receiving a message. The active information in the main node needs to be synchronized frequently. The memory manager will deallocate the allocated memory, when it is monitored that the topic information in a main node is inconsistent with that in the configuration file itself, or both of the transmitter process and the receiver process stop working or subscribes for the current topic any more.

The method provided in the above embodiment of the present application can deallocate the inaccessible memory in time by associating the topic with the requested memory segment, thus avoiding the memory resource waste.

Figure 3:
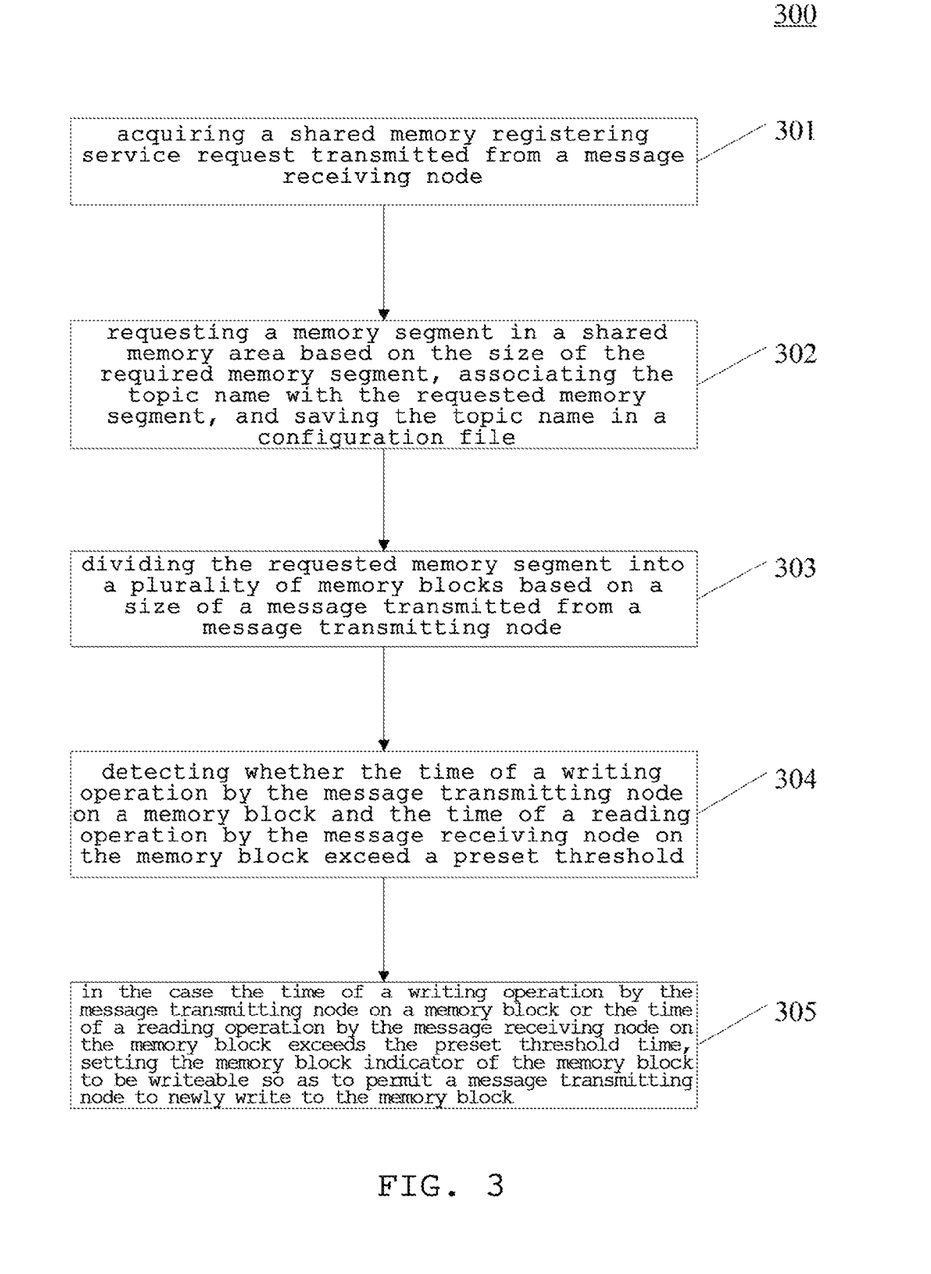
FIG. 3 is a flowchart of a method for managing a shared memory in a robot operating system according to another embodiment of the present application.

Referring to FIG. 3, it shows a flow 300 of a method for managing a shared memory in the robot operating system according to another embodiment. The flow 300 of the method for managing a shared memory in the robot operating system comprises the following steps.

Step 301, acquiring a shared memory registering service request transmitted from a message receiving node.

Step 302: requesting a memory segment in a shared memory area based on the size of the required memory segment, associating the topic name with the requested memory segment, and saving the topic name in a configuration file.

Step 303: dividing the requested memory segment into a plurality of memory blocks based on a size of a message transmitted from a message transmitting node.

Steps 301-303 are substantially the same as steps 201-203, and thus the detailed description of the steps will be omitted.

Step 304, detecting whether the time of a writing operation by the message transmitting node on a memory block and the time of a reading operation by the message receiving node on the memory block exceed a preset threshold.

In this embodiment, if the time of a reading or writing operation which a transmitting or receiving node performs on a memory block is too long, it may be caused by factors such as the memory block abnormality and process death. Then, the memory block will not be used any more and is in a permanently occupied state. Such a memory block is called a "zombie memory". A periodic poll detection is needed to find the "zombie memory".

Step 305, in the case the time of a writing operation by the message transmitting node on a memory block or the time of a reading operation by the message receiving node on the memory block exceeds the preset threshold time, setting the memory block indicator of the memory block to be writeable so as to permit a message transmitting node to newly write to the memory block.

In this embodiment, when the "zombie memory" is found, the memory block indicator of the memory block is set to a writeable state to permit a message transmitting node to write to the memory block again, so as to avoid the excessive waste of the memory.

It can be seen from FIG. 3, compared to the embodiment corresponding to FIG. 2, the flow 300 of the method for managing a shared memory in the robot operating system in the embodiment is characterized in the steps for processing the "zombie memory". Thus, the memory block can be written again according to the solution described in the embodiment, which avoids the waste of the memory.

Figure 4:
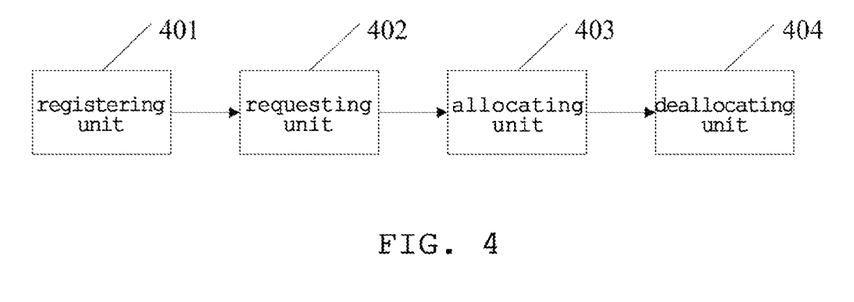
FIG. 4 is a structural schematic diagram of a device for managing a shared memory in a robot operating system according to an embodiment of the present application.

Referring to FIG. 4, which is an implementation of the methods shown in the above-mentioned figures, the present application provides an embodiment of the device for managing a shared memory in the robot operating system. The device embodiment corresponds to the method embodiment shown in FIG. 2, and may be applied to various electronic devices.

As shown in FIG. 4, the device 400 for managing a shared memory in the robot operating system in the embodiment comprises: a registering unit 401, a requesting unit 402, an allocating unit 403 and a deallocating unit 404. The registering unit 401 is configured to acquire a shared memory registering service request transmitted from a message receiving node, the shared memory registering service request comprising a topic name and a size of a required memory segment; the requesting unit 402 is configured to request a memory segment in a shared memory area based on the size of the required memory segment, associate the topic name with the requested memory segment, and save the topic name in a configuration file; the allocating unit 403 is configured to divide the requested memory segment into a plurality of memory blocks based on a size of a message transmitted from a message transmitting node, a size of each of the memory blocks being greater than that of the transmitted message; and the deallocating unit 404 is configured to deallocate the requested memory segment where any one of following conditions is satisfied: the topic name in a main node is inconsistent with that in the configuration file, the message transmitting node and message receiving node stop working, and the message receiving node stops subscribing to a topic corresponding to the topic name, wherein the topic names of the message transmitting node and the message receiving node are maintained by the main node, the message transmitting node notifies the main node of a node name of the message transmitting node and the topic name to be published by the message transmitting node before publishing a message, and the message receiving node notifies the main node of the node name of the message receiving node and the topic name subscribed by the message receiving node before receiving a message.

In this embodiment, the registering unit 401 of the device 400 for managing a shared memory in the robot operating system receives the shared memory service request, wherein the shared memory registering service request comprises a topic name and the size of the required memory segment.

In this embodiment, the requesting unit 402 requests a shared memory segment in the shared memory area according to the shared memory service request received by the registering unit.

In this embodiment, the allocating unit 403 divides the shared memory segment requested by the requesting unit 402 into a plurality of memory blocks according to the size of the message transmitted from the message transmitting node.

In this embodiment, the deallocating unit 404 deallocates the requested memory segment when the memory deallocating condition is satisfied.

In some alternative implementations of the embodiment, the device 400 for managing a shared memory in the robot operating system further comprises a mapping unit, configured to map a starting address of the memory segment returned after the memory segment is requested successfully, into addresses of respective processes of the message transmitting node and the message receiving node.

In some alternative implementations of the embodiment, each of the memory blocks comprises a memory block indicator for indicating a read-write state of the memory block.

In some alternative implementations of the embodiment, the device 400 for managing a shared memory in the robot operating system further comprises a detecting unit, configured to detect whether the time of a writing operation by the message transmitting node on a memory block and the time of a reading operation by the message receiving node on the memory block exceed a preset threshold; and if yes, setting the memory block indicator of the memory block to be writeable so as to permit a message transmitting node to newly write to the memory block.

In some alternative implementations of the embodiment, the memory segment comprises a memory segment indicator for recording sequence numbers of the memory blocks into which a message has been written.

Figure 5:
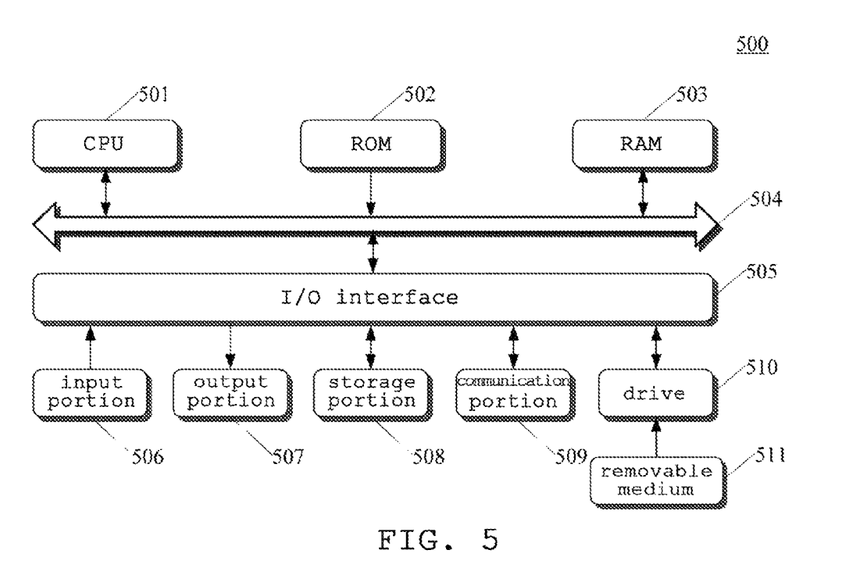
FIG. 5 is a structural schematic diagram of a computer system of a terminal device suitable for implementing the embodiment of the present application.

Referring to FIG. 5, a schematic structural diagram of a computer system 500 adapted to implement a terminal apparatus of the embodiments of the present application is shown.

As shown in FIG. 5, the computer system X00 includes a central processing unit (CPU) 501, which may execute various appropriate actions and processes in accordance with a program stored in a read-only memory (ROM) 502 or a program loaded into a random access memory (RAM) 503 from a storage portion 508. The RAM 503 also stores various programs and data required by operations of the system 500. The CPU 501, the ROM 502 and the RAM 503 are connected to each other through a bus 504. An input/output (I/O) interface 505 is also connected to the bus 504.

The following components are connected to the I/O interface 505: an input portion 506 including a keyboard, a mouse etc.; an output portion 507 comprising a cathode ray tube (CRT), a liquid crystal display device (LCD), a speaker etc.; a storage portion 508 including a hard disk and the like; and a communication portion 509 comprising a network interface card, such as a LAN card and a modem. The communication portion 509 performs communication processes via a network, such as the Internet. A driver 510 is also connected to the I/O interface 505 as required. A removable medium 511, such as a magnetic disk, an optical disk, a magneto-optical disk, and a semiconductor memory, may be installed on the driver 510, to facilitate the retrieval of a computer program from the removable medium 511, and the installation thereof on the storage portion 508 as needed.

In particular, according to an embodiment of the present disclosure, the process described above with reference to FIG. 2 may be implemented in a computer software program. For example, an embodiment of the present disclosure includes a computer program product, which comprises a computer program that is tangibly embedded in a machinereadable medium. The computer program comprises program codes for executing the method of FIG. 2. In such an embodiment, the computer program may be downloaded and installed from a network via the communication portion 509, and/or may be installed from the removable media 511.

The flowcharts and block diagrams in the figures illustrate architectures, functions and operations that may be implemented according to the system, the method and the computer program product of the various embodiments of the present invention. In this regard, each block in the flowcharts and block diagrams may represent a module, a program segment, or a code portion. The module, the program segment, or the code portion comprises one or more executable instructions for implementing the specified logical function. It should be noted that, in some alternative implementations, the functions denoted by the blocks may occur in a sequence different from the sequences shown in the figures. For example, in practice, two blocks in succession may be executed, depending on the involved functionalities, substantially in parallel, or in a reverse sequence. It should also be noted that, each block in the block diagrams and/or the flow charts and/or a combination of the blocks may be implemented by a dedicated hardware-based system executing specific functions or operations, or by a combination of a dedicated hardware and computer instructions.

The units or modules involved in the embodiments of the present application may be implemented by way of software or hardware. The described units or modules may also be provided in a processor, for example, described as: a processor, comprising a registering unit, a requesting unit, an allocating unit and a deallocating unit, where the names of these units or modules are not considered as a limitation to the units or modules. For example, the registering unit may also be described as "a unit for acquiring a shared memory registering service request transmitted from a message receiving node".

In another aspect, the present application further provides a computer readable storage medium. The computer readable storage medium may be the computer readable storage medium included in the apparatus in the above embodiments, or a stand-alone computer readable storage medium which has not been assembled into the apparatus. The computer readable storage medium stores one or more programs. The programs are used by one or more processors to: acquiring a shared memory registering service request transmitted from a message receiving node, the shared memory registering service request comprising a topic name and a size of a required memory segment; requesting a memory segment in a shared memory area based on the size of the required memory segment, associating the topic name with the requested memory segment, and saving the topic name in a configuration file; dividing the requested memory segment into a plurality of memory blocks based on a size of a message transmitted from a message transmitting node, a size of each of the memory blocks being greater than that of the transmitted message; and deallocating the requested memory segment where any one of following conditions is satisfied: the topic name in a main node is inconsistent with that in the configuration file, the message transmitting node and message receiving node stop working, and the message receiving node stops subscribing to a topic corresponding to the topic name, wherein the topic names of the message transmitting node and the message receiving node are maintained by the main node, the message transmitting node notifies the main node of a node name of the message transmitting node and the topic name to be published by the message transmitting node before publishing a message, and the message receiving node notifies the main node of the node name of the message receiving node and the topic name subscribed by the message receiving node before receiving a message.

The foregoing is only a description of the preferred embodiments of the present application and the applied technical principles. It should be appreciated by those skilled in the art that the inventive scope of the present application is not limited to the technical solutions formed by the particular combinations of the above technical features. The inventive scope should also cover other technical solutions formed by any combinations of the above technical features or equivalent features thereof without departing from the concept of the invention, such as, technical solutions formed by replacing the features as disclosed in the present application with (but not limited to), technical features with similar functions.

What is claimed is:

1. A method for managing a shared memory in a robot operating system, comprising:
   acquiring a shared memory registering service request transmitted from a message receiving node, the shared memory registering service request comprising a topic name and a size of a required memory segment;
   requesting a memory segment in a shared memory area based on the size of the required memory segment, associating the topic name with the requested memory segment, and saving the topic name in a configuration file;
   dividing the requested memory segment into a plurality of memory blocks based on a size of a message transmitted from a message transmitting node, a size of each of the memory blocks being greater than a size of the transmitted message; and
   deallocating the requested memory segment where any one of the following conditions is satisfied: the topic name in a main node is inconsistent with a topic name in the configuration file, the message transmitting node and the message receiving node stopped working, and the message receiving node stopped subscribing to a topic corresponding to the topic name, wherein the topic names of the message transmitting node and the message receiving node are maintained by the main node, the message transmitting node notifies the main node of a node name of the message transmitting node and the topic name to be published by the message transmitting node before publishing a message, and the message receiving node notifies the main node of the node name of the message receiving node and the topic name subscribed by the message receiving node before receiving a message.

2. The method according to claim 1, wherein requesting a memory segment in a shared memory area based on the size of required memory segment comprises:
   mapping a starting address of the memory segment returned after the memory segment is requested successfully, into addresses of respective processes of the message transmitting node and the message receiving node.

3. The method according to claim 1, wherein each of the memory blocks comprises a memory block indicator for indicating a read-write state of the memory block.

4. The method according to claim 3, further comprising:
   detecting whether the time of a writing operation by the message transmitting node on a memory block and the time of a reading operation by the message receiving node on the memory block exceed a preset threshold; and if yes, setting the memory block indicator of the memory block to be writeable to permit a message transmitting node to newly write to the memory block.

5. The method according to claim 3, wherein the memory segment comprises a memory segment indicator for recording sequence numbers of the memory blocks into which a message has been written.

6. A device for managing a shared memory in a robot operating system, comprising: a memory; a processor; a registering unit, configured to acquire a shared memory registering service request transmitted from a message receiving node, the shared memory registering service request comprising a topic name and a size of a required memory segment;

a requesting unit, configured to request a memory segment in a shared memory area based on the size of the required memory segment, associate the topic name with the requested memory segment, and save the topic name in a configuration file;

an allocating unit, configured to divide the requested memory segment into a plurality of memory blocks based on a size of a message transmitted from a message transmitting node, a size of each of the memory blocks being greater than a size of the transmitted message; and a deallocating unit, configured to deallocate the requested memory segment where any one of the following conditions is satisfied: the topic name in a main node is inconsistent with a topic name in the configuration file, the message transmitting node and message receiving node stopped working, and the message receiving node stopped subscribing to a topic corresponding to the topic name, wherein the topic names of the message transmitting node and the message receiving node are maintained by the main node, the message transmitting node notifies the main node of a node name of the message transmitting node and the topic name to be published by the message transmitting node before publishing a message, and the message receiving node notifies the main node of the node name of the message receiving node and the topic name subscribed by the message receiving node before receiving a message.

7. The device according to claim 6, further comprising:
a mapping unit, configured to map a starting address of the memory segment returned after the memory segment is requested successfully, into addresses of respective processes of the message transmitting node and the message receiving node.

8. The device according to claim 6, wherein each of the memory blocks comprises a memory block indicator for indicating a read-write state of the memory block.

9. The device according to claim 8, further comprising:
a detecting unit, configured to detect whether the time of a writing operation by the message transmitting node on a memory block and the time of a reading operation by the message receiving node on the memory block exceed a preset threshold; and if yes, setting the memory block indicator of the memory block to be writeable to permit a message transmitting node to newly write to the memory block.

10. The device according to claim 8, wherein the memory segment comprises a memory segment indicator for recording sequence numbers of the memory blocks into which a message has been written.

11. A non-transitory storage medium storing one or more programs, the one or more programs when executed by an apparatus, causing the apparatus to perform a method for managing a shared memory in a robot operating system, the method comprising:

acquiring a shared memory registering service request transmitted from a message receiving node, the shared memory registering service request comprising a topic name and a size of a required memory segment;

requesting a memory segment in a shared memory area based on the size of the required memory segment, associating the topic name with the requested memory segment, and saving the topic name in a configuration file;

dividing the requested memory segment into a plurality of memory blocks based on a size of a message transmitted from a message transmitting node, a size of each of the memory blocks being greater than a size of the transmitted message; and deallocating the requested memory segment where any one of the following conditions is satisfied: the topic name in a main node is inconsistent with a topic name in the configuration file, the message transmitting node and the message receiving node stopped working, and the message receiving node stopped subscribing to a topic corresponding to the topic name, wherein the topic names of the message transmitting node and the message receiving node are maintained by the main node, the message transmitting node notifies the main node of a node name of the message transmitting node and the topic name to be published by the message transmitting node before publishing a message, and the message receiving node notifies the main node of the node name of the message receiving node and the topic name subscribed by the message receiving node before receiving a message.

* * * * *